United States Patent
Case

(10) Patent No.: US 10,613,285 B2
(45) Date of Patent: Apr. 7, 2020

(54) MODULE AND ASSEMBLY FOR FIBER OPTIC INTERCONNECTIONS

(71) Applicant: COMMSCOPE, INC. OF NORTH CAROLINA, Hickory, NC (US)

(72) Inventor: Richard L. Case, Omaha, NE (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 15/888,835

(22) Filed: Feb. 5, 2018

(65) Prior Publication Data
US 2019/0041596 A1 Feb. 7, 2019

Related U.S. Application Data

(63) Continuation of application No. 14/995,966, filed on Jan. 14, 2016, now Pat. No. 9,885,845.

(60) Provisional application No. 62/103,850, filed on Jan. 15, 2015.

(51) Int. Cl.
*G02B 6/44* (2006.01)
*G02B 6/38* (2006.01)

(52) U.S. Cl.
CPC ......... *G02B 6/4452* (2013.01); *G02B 6/3897* (2013.01)

(58) Field of Classification Search
CPC ............................ G02B 6/4452; G02B 6/3897
See application file for complete search history.

(56) References Cited

U.S. PATENT DOCUMENTS

| | | |
|---|---|---|
| 2,773,940 A | 12/1956 | Lebedinsky |
| 3,833,840 A | 9/1974 | Sinden |
| 4,510,565 A | 4/1985 | Dummermuth |
| 4,536,052 A | 8/1985 | Baker et al. |
| 4,824,196 A | 4/1989 | Bylander |
| 4,989,317 A | 2/1991 | Firl et al. |
| 5,093,885 A | 3/1992 | Anton |
| 5,175,673 A | 12/1992 | Roger et al. |
| 5,289,558 A | 2/1994 | Teichler et al. |
| 5,323,454 A | 6/1994 | Shay et al. |
| 5,401,193 A | 3/1995 | Lo Cicero et al. |
| 5,420,958 A | 5/1995 | Henson et al. |
| 5,448,675 A | 9/1995 | Leone et al. |
| 5,461,693 A | 10/1995 | Pimpinella |
| 5,473,717 A | 12/1995 | Baptiste et al. |
| 5,511,144 A | 4/1996 | Hawkins et al. |
| 5,566,836 A | 10/1996 | Lerman |
| 5,575,668 A | 11/1996 | Timmerman |
| 5,613,030 A | 3/1997 | Hoffer et al. |
| 5,638,481 A * | 6/1997 | Arnett .................. G02B 6/3817 385/135 |
| 5,639,261 A | 6/1997 | Rutkowski et al. |
| 5,642,447 A | 6/1997 | Pan et al. |

(Continued)

FOREIGN PATENT DOCUMENTS

| | | |
|---|---|---|
| JP | 2001119177 A | 4/2001 |
| WO | 2009045396 A2 | 4/2009 |

(Continued)

*Primary Examiner* — Peter Radkowski
(74) *Attorney, Agent, or Firm* — Merchant & Gould P.C.

(57) ABSTRACT

A module for interconnecting fiber optic cables and/or cords includes: a housing having a rear wall; a plurality of MPO adapters mounted in the rear wall; and forty-eight fiber optic adapters mounted to a front portion of the housing, the duplex adapters being operatively connected with the MPO adapters.

5 Claims, 5 Drawing Sheets

(56) References Cited

U.S. PATENT DOCUMENTS

| | | | |
|---|---|---|---|
| 5,647,763 A * | 7/1997 | Arnold | G02B 6/3897 439/532 |
| 5,659,648 A | 8/1997 | Knapp et al. | |
| 5,659,650 A | 8/1997 | Arnett | |
| 5,664,955 A | 9/1997 | Arnett | |
| 5,708,742 A | 1/1998 | Beun et al. | |
| 5,712,942 A | 1/1998 | Jennings et al. | |
| 5,734,776 A | 3/1998 | Puetz | |
| 5,737,475 A | 4/1998 | Regester | |
| 5,788,087 A | 8/1998 | Orlando | |
| 5,793,909 A | 8/1998 | Leone et al. | |
| 5,901,033 A | 5/1999 | Crawford et al. | |
| 5,949,946 A * | 9/1999 | Debortoli | G02B 6/3897 385/134 |
| 5,959,767 A | 9/1999 | Fatehi et al. | |
| 5,969,294 A | 10/1999 | Eberle et al. | |
| 5,984,720 A | 11/1999 | Milner et al. | |
| 6,024,610 A | 2/2000 | Schaffer | |
| 6,088,497 A | 7/2000 | Phillips et al. | |
| 6,175,079 B1 | 1/2001 | Johnston et al. | |
| 6,195,262 B1 * | 2/2001 | Bodette | G06F 1/18 361/728 |
| 6,195,493 B1 | 2/2001 | Bridges | |
| 6,208,796 B1 | 3/2001 | Williams Vigliaturo | |
| 6,215,938 B1 | 4/2001 | Reitmeier et al. | |
| 6,250,816 B1 | 6/2001 | Johnston et al. | |
| 6,259,850 B1 | 7/2001 | Crosby, Jr. et al. | |
| 6,278,826 B1 | 8/2001 | BuAbbud et al. | |
| 6,293,707 B1 | 9/2001 | Wild | |
| 6,327,059 B1 | 12/2001 | Bhalia et al. | |
| 6,359,789 B1 * | 3/2002 | Imabayashi | G02B 6/3897 361/730 |
| 6,424,781 B1 | 7/2002 | Puetz et al. | |
| 6,487,356 B1 | 11/2002 | Harrison et al. | |
| 6,489,565 B1 | 12/2002 | Krietzman et al. | |
| 6,524,134 B2 | 2/2003 | Flickinger et al. | |
| 6,535,682 B1 | 3/2003 | Puetz et al. | |
| 6,537,106 B1 | 3/2003 | Follingstad | |
| 6,565,260 B2 | 5/2003 | Belaidi et al. | |
| 6,579,014 B2 | 6/2003 | Melton et al. | |
| 6,584,267 B1 | 6/2003 | Caveney et al. | |
| 6,587,630 B2 | 7/2003 | Spence et al. | |
| 6,616,344 B1 | 9/2003 | Van Deventer | |
| 6,621,974 B1 * | 9/2003 | Chu | G02B 6/4441 385/135 |
| 6,631,237 B2 | 10/2003 | Knudsen et al. | |
| 6,668,127 B1 | 12/2003 | Mahony | |
| 6,758,600 B2 | 7/2004 | Del Grosso et al. | |
| 6,760,531 B1 | 7/2004 | Solheid et al. | |
| 6,761,585 B2 | 7/2004 | Clark et al. | |
| 6,766,095 B1 | 7/2004 | Bjorklunch | |
| 6,796,804 B2 * | 9/2004 | Correa | H05K 1/144 439/61 |
| 6,804,447 B2 | 10/2004 | Smith et al. | |
| 6,809,258 B1 | 10/2004 | Dang et al. | |
| 6,822,874 B1 * | 11/2004 | Marler | H05K 7/1452 361/724 |
| 6,824,312 B2 | 11/2004 | McClellan et al. | |
| 6,850,685 B2 | 2/2005 | Tinucci et al. | |
| 6,866,541 B2 | 3/2005 | Barker et al. | |
| 6,869,227 B2 | 3/2005 | Del Grosso et al. | |
| 6,870,095 B1 | 3/2005 | Whitted | |
| 6,881,076 B2 | 4/2005 | Baker | |
| 6,885,564 B2 | 4/2005 | Hockett | |
| 6,916,199 B2 | 7/2005 | Follingstad | |
| 6,944,389 B2 | 9/2005 | Giraud et al. | |
| 6,955,479 B2 | 10/2005 | Erdman et al. | |
| 6,974,348 B2 | 12/2005 | Bentley | |
| 6,980,725 B1 | 12/2005 | Swieconek | |
| 6,981,893 B2 | 1/2006 | Barker et al. | |
| 6,983,095 B2 | 1/2006 | Reagan et al. | |
| 7,070,459 B2 | 7/2006 | Denovich et al. | |
| 7,088,899 B2 | 8/2006 | Reagan et al. | |
| 7,094,095 B1 | 8/2006 | Caveney | |
| 7,103,255 B2 | 9/2006 | Reagan et al. | |
| 7,118,286 B2 | 10/2006 | Gurreri et al. | |
| 7,142,764 B2 | 11/2006 | Allen et al. | |
| 7,146,089 B2 | 12/2006 | Reagan et al. | |
| 7,147,383 B2 | 12/2006 | Sullivan | |
| 7,171,102 B2 | 1/2007 | Reagan et al. | |
| 7,182,523 B2 | 2/2007 | Abendschein et al. | |
| 7,188,415 B2 | 3/2007 | Robinson et al. | |
| 7,200,317 B2 | 4/2007 | Reagan et al. | |
| 7,207,835 B2 | 4/2007 | Levesque et al. | |
| 7,220,145 B2 | 5/2007 | Denovich et al. | |
| 7,233,731 B2 | 6/2007 | Solheid et al. | |
| 7,244,144 B2 | 7/2007 | Follingstad | |
| 7,300,308 B2 | 11/2007 | Laursen et al. | |
| 7,302,153 B2 | 11/2007 | Thom | |
| 7,306,468 B2 | 12/2007 | Baker | |
| 7,315,681 B2 | 1/2008 | Kewitsch | |
| 7,325,976 B2 | 2/2008 | Gurreri et al. | |
| 7,335,056 B1 | 2/2008 | Clark et al. | |
| 7,357,667 B2 | 4/2008 | Clark et al. | |
| 7,367,823 B2 | 5/2008 | Rapp et al. | |
| 7,393,243 B2 | 7/2008 | Caveney | |
| 7,416,347 B2 | 8/2008 | Livingston et al. | |
| 7,439,449 B1 | 10/2008 | Kumar et al. | |
| 7,455,548 B2 | 11/2008 | Clark et al. | |
| 7,457,503 B2 | 11/2008 | Solheid et al. | |
| 7,488,205 B2 | 2/2009 | Spisany et al. | |
| 7,563,102 B2 | 7/2009 | Nordin et al. | |
| 7,623,749 B2 | 11/2009 | Reagan et al. | |
| 7,651,277 B2 | 1/2010 | Gurreri et al. | |
| 7,668,430 B2 | 2/2010 | McClellan et al. | |
| 7,689,079 B2 | 3/2010 | Bumham et al. | |
| 7,760,516 B2 | 7/2010 | Johnson, Jr. et al. | |
| 7,762,839 B2 | 7/2010 | Chen | |
| 7,821,792 B2 | 10/2010 | Belady et al. | |
| 7,844,159 B2 | 11/2010 | Solheid et al. | |
| 7,874,869 B2 | 1/2011 | Chern et al. | |
| 7,945,138 B2 | 5/2011 | Hill et al. | |
| 8,014,171 B2 | 9/2011 | Kelly et al. | |
| 8,203,450 B2 | 6/2012 | German et al. | |
| 8,410,364 B2 | 4/2013 | Dunwoody et al. | |
| 8,576,580 B2 | 11/2013 | Kelly et al. | |
| 9,042,699 B2 | 5/2015 | Barry et al. | |
| 2001/0001270 A1 | 5/2001 | Williams Vigliaturo | |
| 2002/0125800 A1 | 9/2002 | Knudsen et al. | |
| 2002/0181896 A1 | 12/2002 | McClellan et al. | |
| 2003/0113086 A1 | 6/2003 | Jun et al. | |
| 2003/0129871 A1 | 7/2003 | Follingstad | |
| 2003/0174996 A1 | 9/2003 | Henschel et al. | |
| 2003/0185535 A1 | 10/2003 | Tinucci et al. | |
| 2003/0194187 A1 | 10/2003 | Simmons et al. | |
| 2004/0022494 A1 | 2/2004 | Liddle et al. | |
| 2004/0086252 A1 | 5/2004 | Smith et al. | |
| 2004/0114326 A1 | 6/2004 | Dodgen et al. | |
| 2004/0184741 A1 | 9/2004 | Del Grosso et al. | |
| 2004/0209515 A1 | 10/2004 | Caveney et al. | |
| 2005/0002633 A1 | 1/2005 | Solheid et al. | |
| 2005/0105873 A1 | 5/2005 | Reagan et al. | |
| 2005/0111800 A1 | 5/2005 | Cooke et al. | |
| 2005/0129375 A1 | 6/2005 | Elkins et al. | |
| 2005/0129379 A1 | 6/2005 | Reagan et al. | |
| 2005/0135770 A1 | 6/2005 | McClellan et al. | |
| 2005/0146828 A1 | 7/2005 | Baker | |
| 2005/0175308 A1 | 8/2005 | Elkins et al. | |
| 2005/0191010 A1 | 9/2005 | Gurreri et al. | |
| 2005/0207134 A1 | 9/2005 | Belady et al. | |
| 2005/0220393 A1 | 10/2005 | Huinan et al. | |
| 2006/0008231 A1 | 1/2006 | Reagan et al. | |
| 2006/0029334 A1 | 2/2006 | Quinby et al. | |
| 2006/0063436 A1 | 3/2006 | Gurreri et al. | |
| 2006/0133736 A1 | 6/2006 | Sullivan | |
| 2006/0165365 A1 | 7/2006 | Feustel et al. | |
| 2006/0165366 A1 | 7/2006 | Feustel et al. | |
| 2006/0193591 A1 | 8/2006 | Rapp et al. | |
| 2006/0203460 A1 | 9/2006 | Aviv | |
| 2006/0269208 A1 | 11/2006 | Allen et al. | |
| 2007/0025674 A1 | 2/2007 | Kowalczyk et al. | |
| 2007/0058641 A1 | 3/2007 | Cicchetti et al. | |
| 2007/0104449 A1 | 5/2007 | Thom | |

(56) References Cited

U.S. PATENT DOCUMENTS

| | | |
|---|---|---|
| 2007/0131628 A1 | 6/2007 | Mimlitch et al. |
| 2007/0165995 A1 | 7/2007 | Reagan et al. |
| 2007/0184712 A1 | 8/2007 | Martich et al. |
| 2007/0189693 A1 | 8/2007 | Smrha et al. |
| 2008/0008436 A1 | 1/2008 | Reagan et al. |
| 2008/0008437 A1 | 1/2008 | Reagan et al. |
| 2008/0013910 A1 | 1/2008 | Reagan et al. |
| 2008/0025683 A1 | 1/2008 | Murano |
| 2008/0055847 A1 | 3/2008 | Belady et al. |
| 2008/0075411 A1 | 3/2008 | Solheid et al. |
| 2008/0090433 A1 | 4/2008 | Murano et al. |
| 2008/0096438 A1 | 4/2008 | Clark et al. |
| 2008/0115956 A1 | 5/2008 | Fransen et al. |
| 2008/0146079 A1 | 6/2008 | Spisany et al. |
| 2008/0151524 A1 | 6/2008 | Kelly et al. |
| 2008/0152292 A1 | 6/2008 | Wilken et al. |
| 2008/0175551 A1 | 7/2008 | Smrha et al. |
| 2008/0176445 A1 | 7/2008 | Shifris et al. |
| 2008/0247723 A1 | 10/2008 | Herzog et al. |
| 2009/0016043 A1 | 1/2009 | Hruby et al. |
| 2009/0074372 A1 | 3/2009 | Solheid et al. |
| 2009/0163043 A1 | 6/2009 | Demers et al. |
| 2009/0166404 A1 | 7/2009 | German et al. |
| 2009/0180737 A1 | 7/2009 | Burnham et al. |
| 2009/0185782 A1 | 7/2009 | Parikh et al. |
| 2009/0196563 A1 | 8/2009 | Mullsteff et al. |
| 2009/0236117 A1 | 9/2009 | Garza et al. |
| 2009/0245743 A1 | 10/2009 | Cote et al. |
| 2009/0283488 A1 | 11/2009 | McMillan et al. |
| 2009/0317045 A1 | 12/2009 | Reagan et al. |
| 2010/0006317 A1 | 1/2010 | Hruby et al. |
| 2010/0027953 A1 | 2/2010 | Russell |
| 2010/0061691 A1 | 3/2010 | Murano et al. |
| 2010/0129040 A1 | 5/2010 | Zamzow et al. |
| 2010/0142910 A1 | 6/2010 | Hill et al. |
| 2010/0158465 A1 | 6/2010 | Smrha |
| 2010/0159742 A1 | 6/2010 | Chen |
| 2010/0183270 A1 | 7/2010 | Davis et al. |
| 2010/0202740 A1 | 8/2010 | Barlowe et al. |
| 2010/0279519 A1 | 11/2010 | Mei et al. |
| 2010/0316334 A1 | 12/2010 | Kewitsch |
| 2010/0322554 A1 | 12/2010 | Barnes et al. |
| 2010/0322581 A1 | 12/2010 | Cooke et al. |
| 2010/0322583 A1 | 12/2010 | Cooke et al. |
| 2011/0007470 A1 | 1/2011 | Belady et al. |
| 2011/0044020 A1 | 2/2011 | Hruby et al. |
| 2011/0192631 A1 | 8/2011 | Burek et al. |
| 2011/0286198 A1 | 11/2011 | Kelly et al. |
| 2011/0299266 A1* | 12/2011 | Barry .................. G02B 6/3897 361/826 |
| 2011/0299822 A1 | 12/2011 | Barry et al. |
| 2012/0019177 A1 | 1/2012 | Kaufmann et al. |
| 2012/0057836 A1 | 3/2012 | Andrzejewski et al. |
| 2013/0078624 A1* | 3/2013 | Holmes .................. C12Q 1/00 435/6.11 |
| 2013/0308915 A1 | 11/2013 | Buff et al. |
| 2015/0077923 A1* | 3/2015 | Rauline ................ H05K 7/1489 361/679.39 |
| 2015/0077924 A1* | 3/2015 | Rauline ................ H05K 7/1489 361/679.39 |
| 2016/0370550 A1* | 12/2016 | Barry .................. G02B 6/3897 |

FOREIGN PATENT DOCUMENTS

| | | |
|---|---|---|
| WO | 2009089041 A1 | 7/2009 |
| WO | 2009091465 A2 | 7/2009 |
| WO | 2010024842 A1 | 3/2010 |

* cited by examiner

MODULE AND ASSEMBLY FOR FIBER OPTIC INTERCONNECTIONS

RELATED APPLICATION

The present application is a Continuation of U.S. patent application Ser. No. 14/995,966, filed Jan. 14, 2016, now U.S. Pat. No. 9,885,845; which claims priority from and the benefit of U.S. Provisional Patent Application No. 62/103,850, filed Jan. 15, 2015, the disclosures of which are hereby incorporated herein in their entirety.

FIELD OF THE INVENTION

The present invention is directed to datacommunications equipment, and in particular datacommunications equipment for fiber optic interconnections.

BACKGROUND

A network patching system is typically used to interconnect the various communication lines within a closet or computer room. In a conventional network patching system, the communication lines are terminated within a closet in an organized manner via one or more patch panels mounted on a rack or frame. Multiple ports are included in the patch panel, typically in some type of organized array. Each of the different ports is connected with a communications line. In small patching systems, all communications lines may terminate on the patch panels of the same rack. In larger patching systems, multiple racks may be used, wherein different communications lines terminate on different racks. Interconnections between the various communications lines are made connecting patch cords to the ports. By selectively connecting the various communications lines with patch cords, any combination of communications lines can be interconnected.

It may be desirable to provide different devices for interconnecting datacommunications lines.

SUMMARY

As a first aspect, embodiments of the invention are directed to a module for interconnecting fiber optic cables and/or cords. The module comprises: a housing having a rear wall; a plurality of MPO adapters mounted in the rear wall; and forty-eight fiber optic adapters mounted to a front portion of the housing, the fiber optic adapters being operatively connected with the MPO adapters.

As a second aspect, embodiments of the invention are directed to an assembly for interconnecting fiber optic cables and/or cords comprising a 1 U telecommunications shelf and two fiber optic telecommunications modules mounted to the shelf. Each of the modules comprises: a housing having a rear wall; a plurality of MPO adapters mounted in the rear wall; and forty-eight fiber optic adapters mounted to a front portion of the housing, the fiber optic adapters being operatively connected with the MPO adapters.

As a third aspect, embodiments of the invention are directed to an assembly for interconnecting fiber optic cables and/or cords comprising a 1 U telecommunications shelf having a window with side edges and two fiber optic telecommunications modules mounted to the shelf. Each module comprises: a housing having a rear wall; a plurality of MPO adapters mounted in the rear wall; forty-eight fiber optic adapters mounted to a front portion of the housing, the fiber optic adapters being operatively connected with the MPO adapters; and latches that engage the side edges of the window to snap-mount the module to the shelf. Each of the modules is configured to be oriented in the shelf in an upright or an inverted orientation, and wherein each module further comprises a faceplate indicating the upright and inverted orientations.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
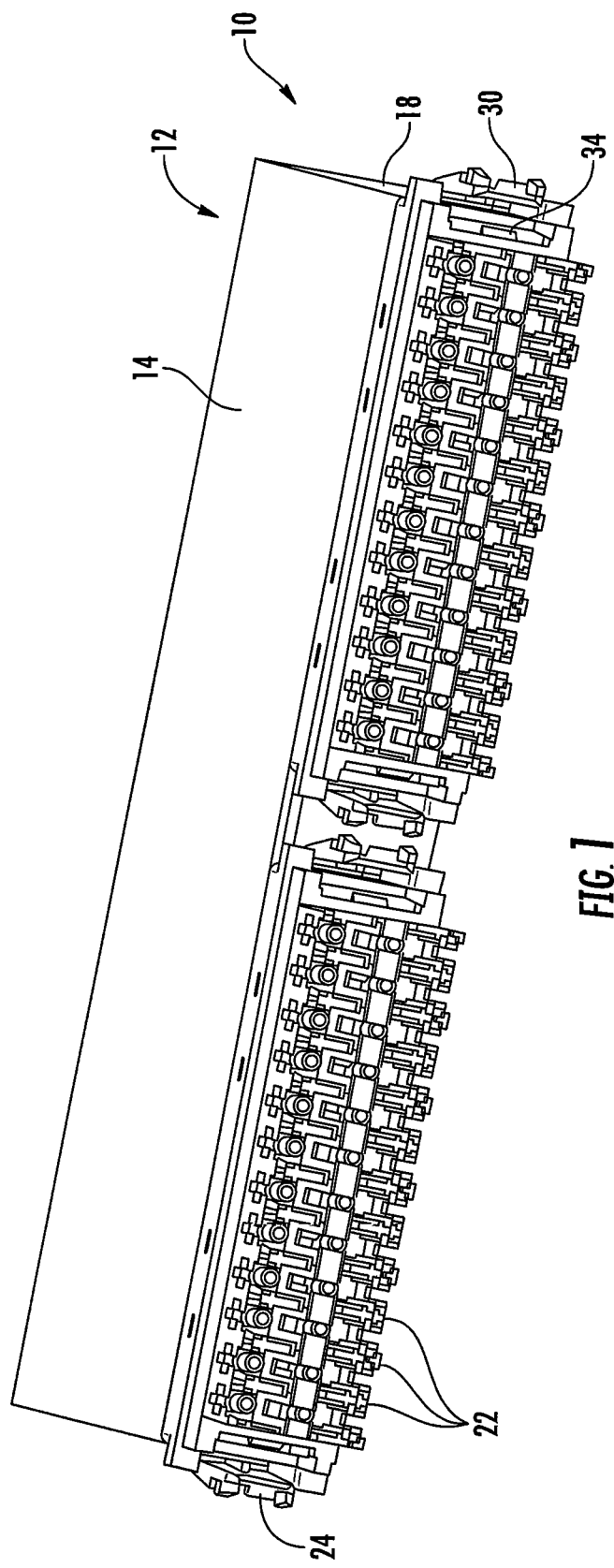
FIG. 1 is a front perspective view of a module for interconnecting fiber optic cables and cords according to embodiments of the invention.
Figure 2:
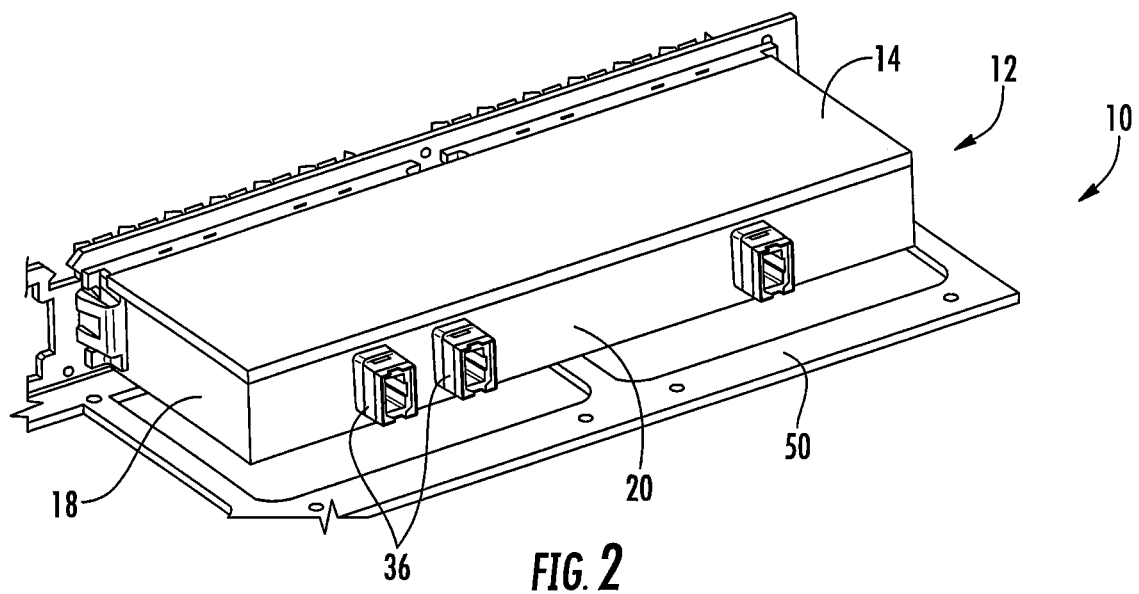
FIG. 2 is a rear perspective view of the module of FIG. 1.

Referring now to FIGS. 1 and 2, a telecommunications module for interconnecting fiber optic cables and cords, designated broadly at 10, is shown therein. The module 10 includes a box-like housing 12 with a ceiling 14, a floor (not shown), side walls 18, and a rear wall 20. The housing 12 is sized to mount on a shelf sized at 1 U (i.e., approximately 1.75 inches in height). On its front side, the module 10 includes two sets of 24 duplex fiber optic adapters 22. Each set of fiber optic adapters 22 is arranged in upper and lower rows of twelve adapters each, with the sets of adapters 22 being side-by-side across the front of the module 10. The adapters 22 are conventional fiber optic adapters and need not be described in detail herein.

Figure 3:
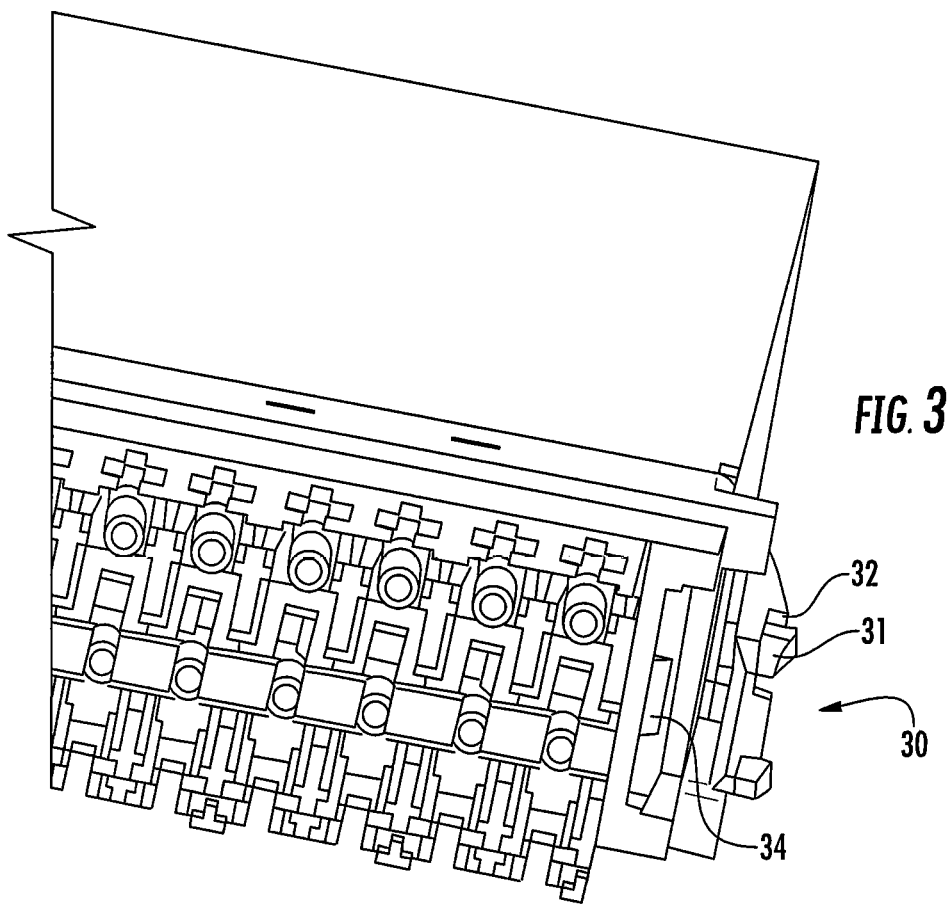
FIG. 3 is an enlarged partial front perspective view of one of the latches of the module of FIG. 1 used to attach the module to a fiber shelf.
Figure 4:
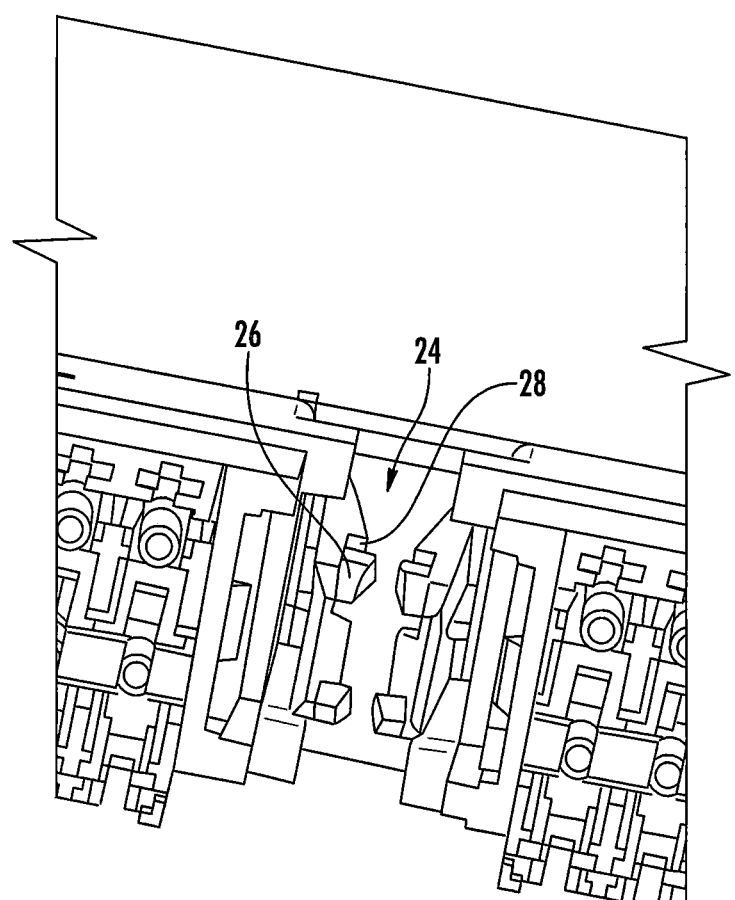
FIG. 4 is an enlarged partial front perspective view of another of the latches of the module of FIG. 1 used to attach the module to a fiber shelf.

Referring now to FIGS. 1 and 4, the front side of the module 10 also includes features that enable the module 10 to be attached to a 1 U fiber shelf 50. A pair of snap latches 24 are located between the sets of adapters 22 and project forwardly. Each of the snap latches 24 has a hook 26 and an opposed shoulder 28 that enables it to receive a vertical edge of the shelf 50. In addition, a latch 30 (FIG. 3) projects forwardly from each of the lateral edges of the module 10; each latch 30 includes a hook 31 and a shoulder 32 that can receive a vertical edge of the shelf 50.

Referring now to FIGS. 1 and 3, the front side of the module 10 also includes two latching projections 34 that are located on opposite sides of the sets of adapters 22. These latching projections 34 enable the module to mount a kit for "intelligent patching" (i.e., a system that can track connectivity of cords and cables connected to the adapters 22). An exemplary system/kit is the iPATCH® system, available from CommScope, Inc., (Hickory, N.C.).

Referring now to FIG. 2, three MPO connectors 36 are mounted to the rear wall 20 of the housing 12. These MPO connectors 36 are sixteen fiber connectors that receive a sixteen fiber MPO attached to a fiber optic cable.

The housing 12 protects optical fibers (not shown) that extend between the MPO connectors 36 and the adapters 22. There are multiple arrangements of such fibers known to those of skill in this art that need not be described in detail herein.

Figure 5:
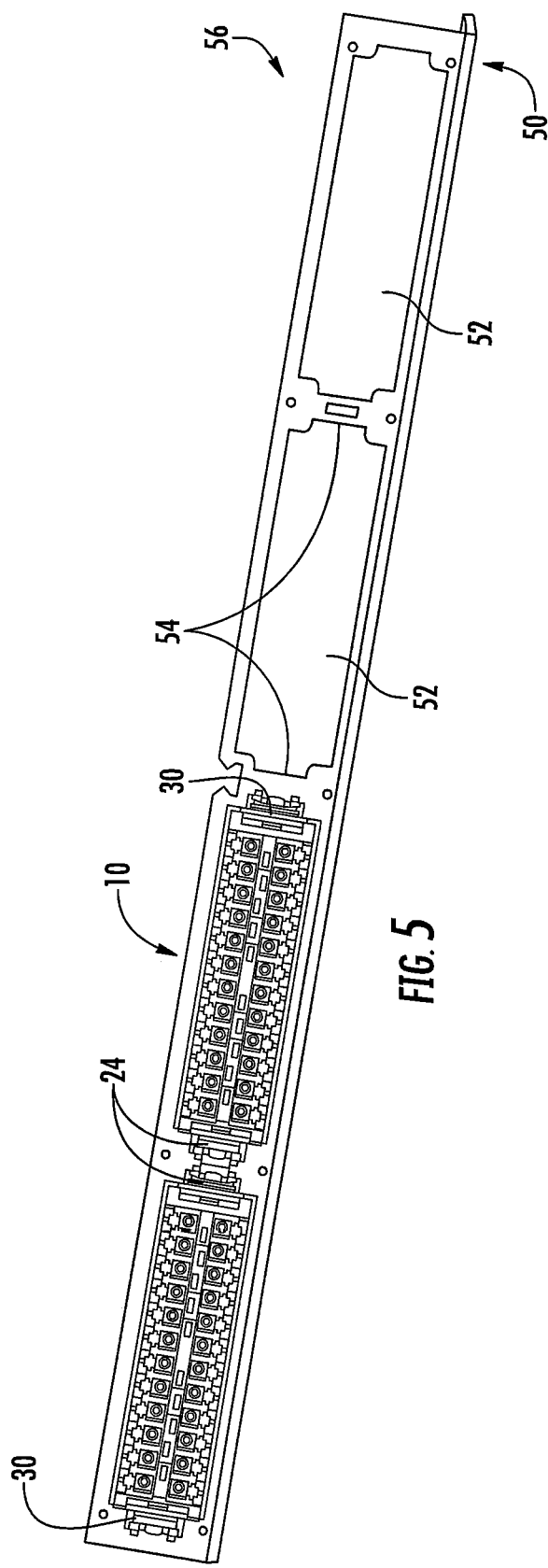
FIG. 5 is front perspective view of the module of FIG. 1 attached to a fiber shelf.

FIG. 5 illustrates the module 10 mounted in the shelf 50. As can be seen in FIG. 5, the shelf 50 includes four windows 52 with vertical side edges 54 (only two windows 52 are visible in FIG. 5). The module 10 is mounted on the shelf 50 by inserting the adapters 22 through the windows 50; the latches 24 contact the side edges 54 and deflect, then recover, as the module 10 is moved forward to snap-mount the module 10 on the shelf 50. The side edges 54 of the window 50 are captured between the hooks 26 and the shoulders 28 of the latches 24. Similarly, the latches 30 engage respective side edges 54 of the window 50 and deflect, then recover to capture the side edges 54 between the hooks 31 and the shoulders 32. The latching projections 34 are free to receive an intelligent patching kit if desired. The resulting assembly 56 comprising the shelf 50 and two modules 10 can be mounted within a 1 U space on a conventional telecommunications rack or cabinet.

Figure 6:
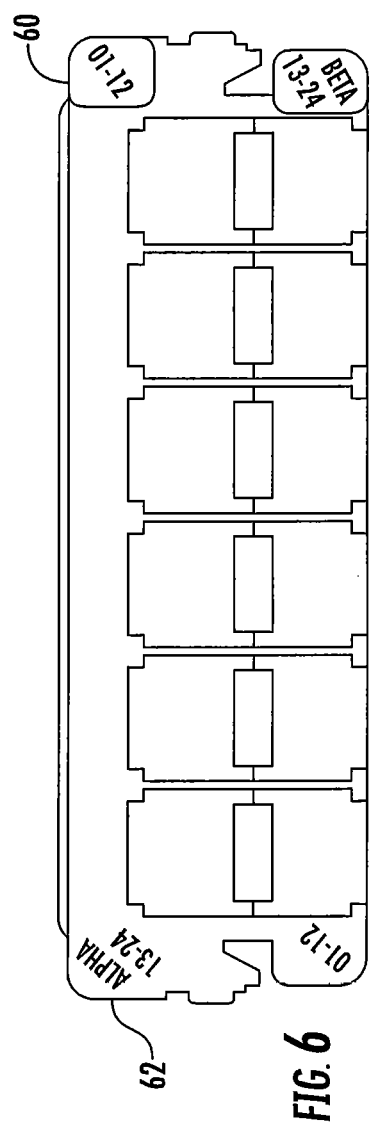
FIG. 6 is a front view of a labeling plate attached to the front side of the module of FIG. 1.

FIG. 6 shows the module 10 with a faceplate 60 attached thereto for assisting with orientation of the module 10. As discussed at length in U.S. Pat. No. 7,416,347, the disclosure of which is hereby incorporated herein in its entirety, fiber optic modules often have an "ALPHA" or "BETA" orientation in order to provide proper connectivity for the fibers connected thereto. The faceplate 60 includes indicia 62 that is oriented so that an operator can quickly discern an "ALPHA" or "BETA" configuration of the module 10 irrespective of whether the module 10 is horizontally or vertically oriented.

Figure 7:
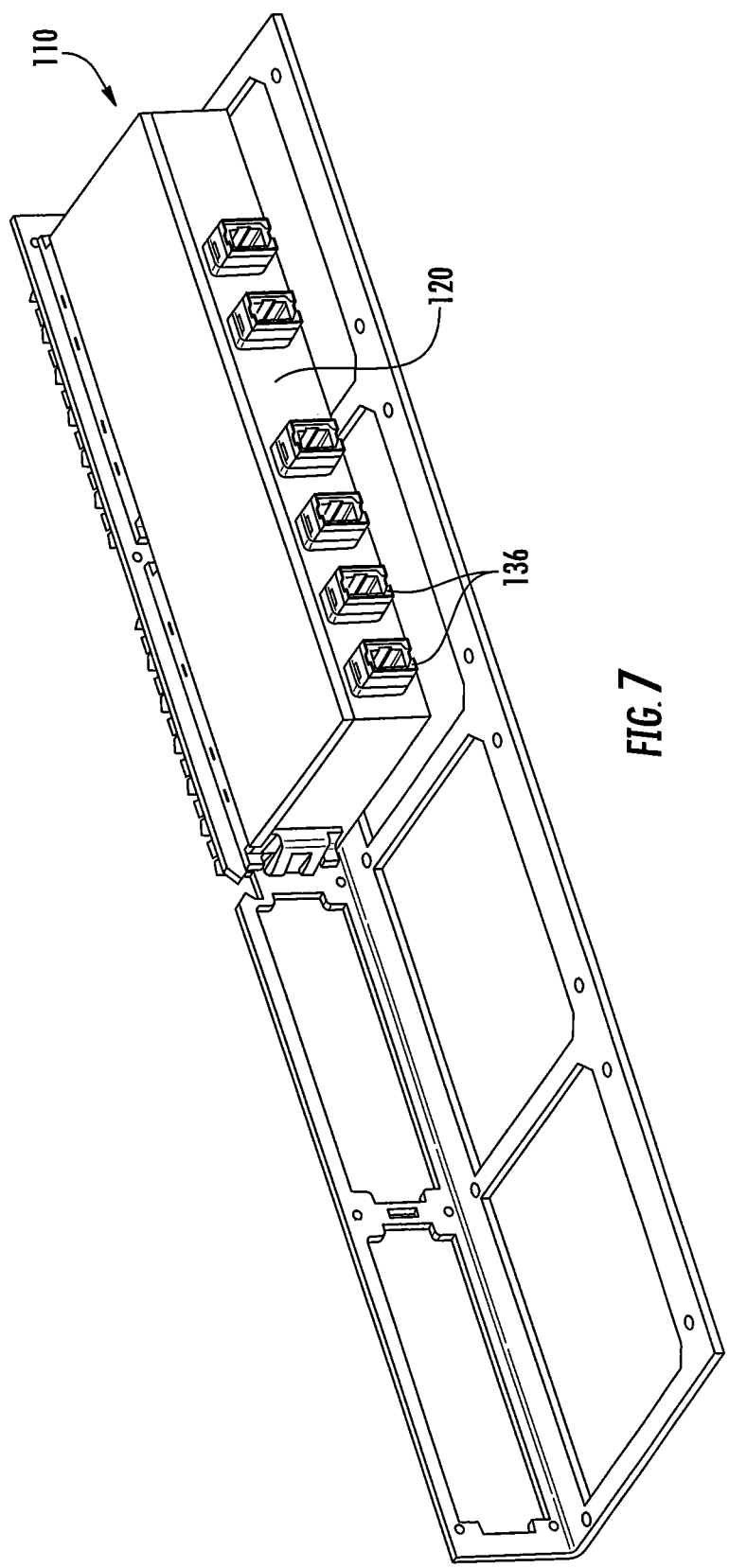
FIG. 7 is a rear perspective view of an alternative embodiment of a module for interconnecting fiber optic cables and cords.

FIG. 7 illustrates another fiber optic module 110 according to embodiments of the invention. The module 110 includes three TAP connectors 136 on its rear wall 120.

It should also be noted that, because the modules 10, 110 include 48 fiber optic adapters 22, they are configured to be able to receive either three 16-fiber MPOs or four 12-fiber MPOs. As such, the modules can be employed through transitions between 12-fiber based systems and 16-fiber based systems. Thus, as higher data transmission speeds (such as 40 Gb, 100 Gb, or even 400 Gb) become more standard and/or commonplace, the modules can be modified to address the changing needs of end users.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A module for interconnecting fiber optic cables and/or cords, comprising:
a housing having a rear wall;
a plurality of MPO adapters mounted in the rear wall;
forty-eight fiber optic adapters mounted to a front portion of the housing, the fiber optic adapters being operatively connected with the MPO adapters, wherein the module further comprises a first set of latches that are configured for snap-mounting the module to a telecommunications shelf and a second set of latches having a different configuration than the first set of latches, the second set of latches configured to allow the module to be snap-mounted to a piece of telecommunications equipment different than the telecommunications shelf and different than the fiber optic adapters mounted to the front portion of the housing, the second set of latches being configured such that the second set of latches are free to receive the piece of telecommunications equipment that is different than the telecommunications shelf and that is different than the fiber optic adapters when the module has been mounted to the telecommunications shelf with the first set of latches.

2. The module defined in claim 1, wherein the plurality of MPO adapters is three adapters.

3. The module defined in claim 1, wherein the plurality of MPO adapters is four adapters.

4. The module defined in claim 1, configured to be oriented in an upright or an inverted orientation, and further comprising a faceplate indicating the upright and inverted orientations.

5. The module defined in claim 1, wherein the forty-eight fiber optic adapters comprise twenty-four duplex fiber optic adapters.

* * * * *